United States Patent
Niemelä et al.

(10) Patent No.: US 8,981,902 B2
(45) Date of Patent: Mar. 17, 2015

(54) CONTROLLING LOCATION INFORMATION

(75) Inventors: Jarno Niemelä, Espoo (FI); Veli-Jussi Kesti, Espoo (FI); Pirkka Palomäki, Helsinki (FI)

(73) Assignee: F-Secure Corporation, Helsinki (FI)

( * ) Notice: Subject to any disclaimer, the term of this patent is extended or adjusted under 35 U.S.C. 154(b) by 732 days.

(21) Appl. No.: 12/587,716

(22) Filed: Oct. 13, 2009

(65) Prior Publication Data

US 2011/0084803 A1 Apr. 14, 2011

(51) Int. Cl.
*G08B 5/22* (2006.01)
*H04W 24/00* (2009.01)
*G01S 19/00* (2010.01)
*H04L 29/06* (2006.01)
*G06F 21/62* (2013.01)
*H04W 4/02* (2009.01)
*H04W 8/16* (2009.01)

(52) U.S. Cl.
CPC ........ *H04L 63/0407* (2013.01); *G06F 21/6245* (2013.01); *H04W 4/028* (2013.01); *H04W 8/16* (2013.01); *G06F 2221/2111* (2013.01); *H04W 4/02* (2013.01)
USPC ...... 340/8.1; 340/988; 455/435.1; 455/456.1; 455/457; 455/414.1; 455/414.4; 342/357.2; 342/450; 342/451

(58) Field of Classification Search
USPC ........ 340/825.49, 988, 825.44; 455/435, 456, 455/457; 342/357.01, 357.88, 357.09, 342/357.1, 450, 451
See application file for complete search history.

(56) References Cited

U.S. PATENT DOCUMENTS

| | | | | |
|---|---|---|---|---|
| 6,594,483 | B2 * | 7/2003 | Nykanen et al. | 455/411 |
| 6,640,184 | B1 * | 10/2003 | Rabe | 701/517 |
| 7,139,820 | B1 * | 11/2006 | O'Toole et al. | 709/223 |
| 2002/0057283 | A1 * | 5/2002 | Biswas et al. | 345/700 |
| 2007/0264974 | A1 | 11/2007 | Frank et al. | 455/411 |
| 2008/0147612 | A1 * | 6/2008 | Gryaznov | 707/3 |
| 2010/0240398 | A1 * | 9/2010 | Hotes et al. | 455/456.2 |

FOREIGN PATENT DOCUMENTS

WO  WO-02/093291 A2  11/2002

OTHER PUBLICATIONS

Krumm, John, "Realistic Driving Trips for Location Privacy", Pervasive Computing, May 11, 2009, pp. 25-41.

(Continued)

*Primary Examiner* — Daniel Wu
*Assistant Examiner* — Mancil Littlejohn, Jr.
(74) *Attorney, Agent, or Firm* — Harrington & Smith

(57) ABSTRACT

A method and apparatus for controlling location information at a computer device such as a mobile telephone. Location information is intercepted and obtained by, for example, intercepting it from an Application Programming Interface destined for a location application. The location application is identified, and a rule is determined for applying to the location information on the basis of the identified location application. The rule is applied to the location information to give amended location information, and the amended location information is then sent to the location application.

17 Claims, 3 Drawing Sheets

(56) References Cited

OTHER PUBLICATIONS

Ardagna, C.A., et al., "Location Privacy Protection Through Obfuscation-based Techniques", Proceedings of the 21$^{st}$ Annual IFIP WG 11.3 working conference on Data and applications security, Jul. 8, 2007, pp. 47-60.

Jafarian, Jafar Haadi et al., "Protecting Location Privacy through a Graph-Based Location Representation and a Robust Obfuscation Technique", Information Security and Cryptology-ICISC 2008, pp. 116-133.

* cited by examiner

CONTROLLING LOCATION INFORMATION

TECHNICAL FIELD

The invention relates to the field of maintaining the privacy of location information.

BACKGROUND

Computer devices, and especially mobile computer devices such as laptop computers, mobiles telephones, Personal Digital Assistants and so on, may be provided with location software that allows third parties to know the geographical location of the device (and by association, the user of the device).

Taking the example of a mobile device such as a mobile telephone, a location application is run at the mobile device. The location application obtains location information from, for example, a navigation satellite system such as the Global Positioning System (GPS). Other types of location information may be used. For example, the identity of the network cell in which the mobile device is located can provide crude location information to the location application, accurate to within, say, 1 kilometer. Alternatively, the identity of an Access Point (AP) to a Wireless Local Area Network (W-LAN) can also be used to provide crude location information to the location application.

Once the location application has obtained the location information, the location information is made available to third parties. This may be publicly available or restricted to a group of users known to the mobile device user. For example, Alice has a mobile device that has a location application installed on it. The location application uses GPS to find location information. When Alice's location application is turned on, the location application obtains GPS data and keeps an accurate record of Alice's geographical location. Bob is one of Alice's friends, and wishes to know where Alice is, so Bob uses his mobile device to communicate with Alice's mobile device, and the location application provides Alice's geographical information to Bob's device.

There are some circumstances in which Alice may not wish Bob to know where she is, although she wishes to maintain the appearance that her location application is reporting her location. For example, if Alice is a freelance worker, she may work for several different companies, who may be competitors. In this case, Alice may not wish third parties to know where she is, how long she is spending with her clients, and so on. However, she may still wish to use other functionality of the location application, for example a map function. It would be desirable to allow a user to run a location application in a "privacy mode"; a mode in which the location application is active, but does not report the real geographical location of the device to third parties.

SUMMARY

This invention addresses the problem of providing a privacy mode to users of location applications.

According to a first aspect of the invention, there is provided a method of controlling location information at a computer device such as a mobile telephone. Location information destined for a location application is intercepted and obtained. The location application is identified, and a rule is determined for applying to the location information on the basis of the identified location application. The rule (which may be, for example, to amend the location information) is applied to the location information to give amended location information, and the amended location information is then sent to the location application. In this way, control is exercised over what location information the location application receives. The location application need not be aware that the location information has been amended, and so the invention can hide a user's location from, for example, third parties accessing the location application.

There are several ways in which location information can be obtained. One is to intercept location information from an Application Programming Interface that is destined for the location application. However, location information may also be obtained by, for example, determining an identity of a mobile cell to which the computer device is connected, or an identity of an Access Point to a Wireless Local Area Network to which the computer device is connected. The determined identity can then be mapped to a geographical location.

Examples of rules that may be applied to the location information include any of replacing the location information with less specific location information, replacing the location information with location information specified by a user, replacing the location information with previous location information previously approved by the user, replacing the location information with no location information, and making no changes to the location information.

The rules may further comprise varying the amended location information with time prior to sending the location information to the location application. This variation may be based on historical location information, or randomly applied. In either case, it reduces the likelihood of detecting that the location information sent to the location application has been modified in some way.

In some cases, it will not be possible to identify the location application. In this case, a predetermined rule may be applied to the location information to give amended location information, prior to sending the amended location information to the location application.

The method optionally comprises alerting a user of the device that a location application has requested location information. This will allow the user to determine that someone is trying to find his location.

As an option, the method further comprises sending from the computer device to a remote node information relating to the location application, and receiving from the remote node further information relating to the identified location application. For example, if the location application is malware, the further information may be a malware warning or instructions for removing the malware. As an option, the method further comprises terminating the location application as a result of receiving information relating to the identified location application.

The invention may be used for any type of location information. Examples of such location information include Global Positioning System data, an identity of an Access Point (AP) to a Wireless Local Area Network, an identity of a network cell in which the computer device is located, and other types of satellite positioning information.

According to a second aspect of the invention, there is provided a computer device for use in a communications network. The computer device comprises a location application. A privacy function is also provided that is arranged to intercept and obtain location information destined for the location application. A database is provided for storing a plurality of rules to apply to the location information. The database is provided with at least one rule entry for each identified location application. A processor is arranged to apply the rule to the location information to give amended location information prior to sending the amended location information to the location application.

As an option, the processor is arranged to handle Application Programming Interfaces, and the privacy function is arranged to obtain location information by intercepting location information from an Application Programming Interface destined for the location application. However, other methods of obtaining location information may be used, such as determining an identity of a mobile cell to which the computer device is connected, or an identity of an Access Point to a Wireless Local Area Network to which the computer device is connected. The determined identity can then be mapped to a geographical location.

The database optionally further comprises at least one rule to be applied to the intercepted location information in the event that an identified location application is not stored in the database.

The computer device optionally comprises a user input device allowing a user to enter data for one of populating the database and amending rules.

As a further option, the computer device is provided with a transmitter for sending to a remote node information for use in identifying the location application, and a receiver for receiving from the remote node further information relating to the location application.

The rule may optionally be any of replacing the location information with less specific location information, replacing the location information with location information specified by a user, replacing the location information with previous location information previously approved by the user, replacing the location information with no location information, and making no changes to the location information.

According to a third aspect of the invention, there is provided a node for use in a communication network. The node comprises a receiver for receiving information from a remote device, the information relating to a location application at the remote device that provides location information to third parties. A processor is also provided for comparing the received information with information stored at a database. A transmitter is provided for sending to the remote device further information relating to the location application.

The transmitter is optionally arranged to send to the remote device a request for additional information relating to the location application.

According to a fourth aspect of the invention, there is provided a computer program comprising computer readable code which, when run on a computer device, causes the computer device to execute a method as described in the first aspect of the invention.

According to a fifth aspect of the invention, there is provided a computer program comprising computer readable code which, when run on a computer device, causes the computer device to behave as a device as described in the second aspect of the invention.

According to a sixth aspect of the invention, there is provided a computer program comprising computer readable code which, when run on a node, causes the node to behave as a node as described in the third aspect of the invention.

There is also provided a computer program product comprising a computer readable storage medium or a computer readable memory and a computer program as described in any of the fourth, fifth and sixth aspects of the invention, wherein the computer program is stored on the computer readable storage medium/memory.

DETAILED DESCRIPTION

Figure 1:
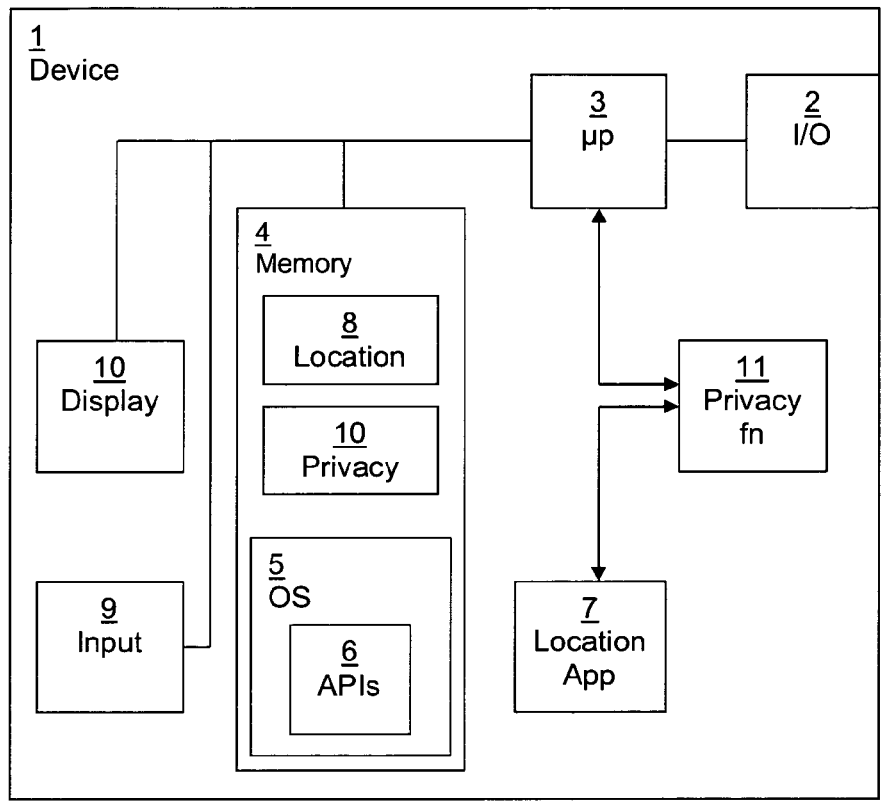
FIG. 1 illustrates schematically in a block diagram a mobile device according to an embodiment of the invention.

Referring to FIG. 1 herein, a device 1 is provided. This may be any device that uses a location application. In this example, the device 1 is a mobile device such as a mobile telephone. The device 1 is provided with a communications device 2 and a processor 3 for handling messaging and performing other computing functions. A memory 4 is provided that stores an Operating System. The Operating System includes Application Programming Interfaces (APIs) 6 that are essentially interface that define the ways in which an application requests services from libraries and other Operating System resources. A location application 7 is provided. In the embodiment shown in FIG. 1 this is shown as a separate function, although it may easily be implemented as software 8 stored in the memory or retrievable from a remote node via the communications device 2. The location application 7 uses APIs to access location services (which may be, for example, GPS, W-LAN Access Point, network cell and so on).

A location application 7 is an application such as Google Maps™ that uses geographical location information to illustrate where the device is located. This may be in a graphical format or some other type of format. A location application 7 may be software installed by the user of the device, or may be a component of the Operating System of the device. Some location applications 7 allow third parties to access the location of the device. The geographical location may be accurate, for example if it is derived from Global Positioning System data. The location information is less accurate if it relies on, for example, an identity of a cell in a mobile network to which the device 1 is attached. As cell coverage may extend for several kilometers, the location information gives only an approximate location of the device 1.

The device is also provided with an input device 9 that allows a user to input data, for example, a keyboard, a mouse or a touch screen, and a display 10 that is arranged to show information to the user of the device.

In addition to the standard features described above, the device 1 is also provided with a privacy function 11. As with the location application 7, the privacy function 11 is illustrated as a separate function, although it may be implemented by the processor by executing privacy software 10 stored in the memory or retrieved from a remote node via the communications device 2.

The privacy function 11 allows the user of the device to control what the location information sent to the location application 7, and hence what information about the device's location is accessible to third parties.

Figure 2:
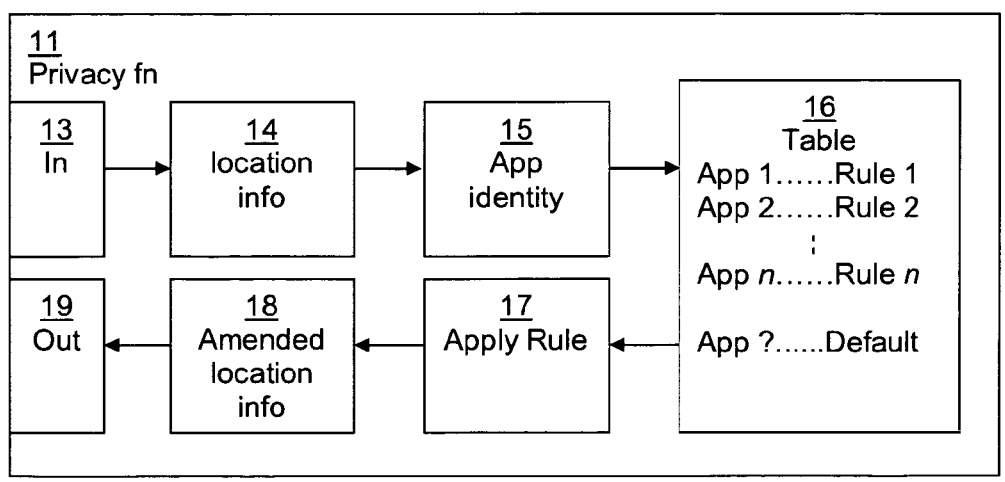
FIG. 2 illustrates schematically in a block diagram the components of a privacy function according to an embodiment of the invention.

The privacy function 7 hooks the APIs that deal with location information. In other words, it intercepts Operating System 5 calls relating to location information, and identifies that the location information is being sent to the location application 7. The location information may be altered according to predetermined or user defined parameters, before being sent to the location application 7. An example of the sort of API that would be hooked in this way is the Windows 7™ location API. The privacy function 11 identifies that it is the location application 7 that is requesting location information Referring to FIG. 2 herein, there are illustrated functions of the privacy function 11. The privacy function includes an input function 13 to receive location information 14 and a further function 15 to identify the application to which the location information is destined. A table of rules 16 is provided that maps rules for altering the location information depending on which application is requesting the location information. For example, if Application 1 is identified, then the rule might be that no modification is made to the location information before the location information is sent to the location application 7. In the case of Application 2, the rule may be that no location information is sent to the location application 7. A function 17 is provided for applying the rule to give amended location information 18. The privacy function 11 also includes an output function 19 to output the amended location information 16 from the privacy function 11 to the location application 7.

As the APIs that deal with location information have been hooked by the privacy function 11, the location application 7 has no way of knowing that the location information provided to it is not the original location information.

Note that another embodiment of the invention does not rely on hooking APIs using the privacy function, but merely intercepting data such as the identity of a mobile cell to which the device 1 is attached, and querying a database to determine the geographical location of the cell. A similar determination could be made using the identity of an Access Point to a W-LAN. In this case, any instances of the location application attempting to use the identity of a mobile cell or an access point can be intercepted and handled according to the table of rules 16.

Examples of rules for amending the location information include, but are not limited to the following:

The location information is replaced with approximate location information. For example, if the location information is GPS co-ordinates, it could be approximated to a country, a city, a block, or a certain radius. This may not always be a feasible option if the location application does not deal with "approximate" location information, as the location information will assume that the location information provided is exact. This can lead to spurious results, such as a user being reported to be in an ocean when they are in a coastal area.

The location information is replaced with the last location approved by the user. For example, if Alice in Paris and sets Paris as the last approved location, if she subsequently travels to Berlin the location application 7 will still receive information from the privacy function 11 that locates her in Paris.

The location information is replaced with a location specified by the user. This may be selected from a map, or any other selection method, for example by entering a zip code.

No location is sent, preventing the location application 7 from knowing Alice's location.

Rules can be set by the user using the user input 9 and the display 10, or may be preconfigured in the rules table 16.

Rules need not only apply to the location information itself. Rules may also include other actions to take, such as automatically terminating the location application, alerting a remote server that the location application is running, and so on.

A further function of the privacy function is to alert the device 1 user when a location API has been hooked. In addition to letting the user know that an application is calling a user API, information can be obtained that identifies the application that requires the location information. When the user is alerted to the fact that a new application is attempting to obtain location information, the applicant has the option setting a rule, as described above, for location information being sent to the new application. This allows a user to configure any new application to his or her preferences, or to terminate the application. It also allows the user to become aware of any application that requests location information that is running on the device without the user's knowledge or consent.

In a further embodiment, the privacy function may vary the location information with time. Unless the user is sleeping, they are unlikely to remain in exactly the same location for significant periods of time. There are several ways that this can be done. For example, the location could be moved randomly, or it could use historical data to repeat the user's previous movements within an area. This reduces the possibility that the location application 7 can detect that the location information that it has received has been altered in some way.

Furthermore, when an application is first identified that requires location information, details of the application can be sent to a remote server. The remote server has access to a database of applications that require location information, and can send a response to the device to assist the device in dealing with the application. For example, if it is determined that the application is malware, then steps can be taken to remove the malware from the device.

If the server cannot identify the application, then information relating to the application may be stored in a database and further information collected from the device in order to attempt to identify the application.

Figure 3:
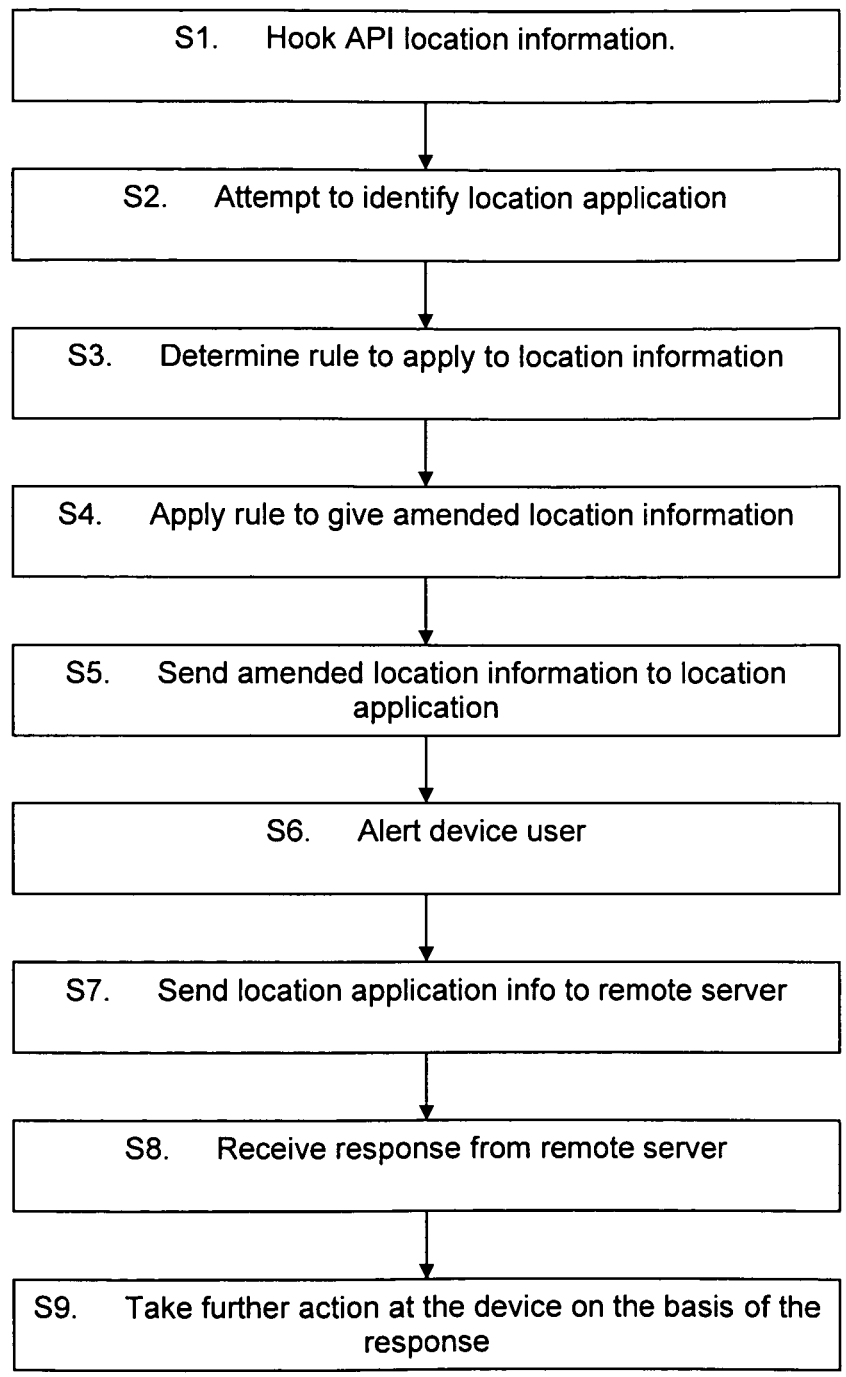
FIG. 3 is a flow diagram illustrates the steps of embodiments of the invention.

Turning now to FIG. 3, a flow diagram is shown illustrating stages of the invention, with the following numbering corresponding to that of FIG. 3:

S1. The privacy function 11 hooks location information from a location API.
S2. An attempt is made to identify the location application.
S3. On the basis of the identification, or lack of identification, a determination is made of a rule to apply to the location information.
S4. The determined rule is applied to the location information to give amended location information.
S5. The amended location information is sent to the location application.
S6. In an embodiment of the invention, the user is alerted to the fact that a location application has requested location information. This may include an identity of the location application, and a query for the user to enter an action to take. This may involve certain amendments to the location information, or terminating the location application.
S7. In a further embodiment of the invention, information relating to the location application is sent to a remote server. This may be an identity of the location application, the type of location information being sought by the location application, the location in a file system of the location application or any other pertinent information.
S8. The remote server responds with further information. This may be, for example, an identity of the location application, or a suggested course of action to take, such as terminating the location application and removing it from the device memory.
S9. If necessary, the device takes further action on the basis of the remote server's response.

Figure 4:
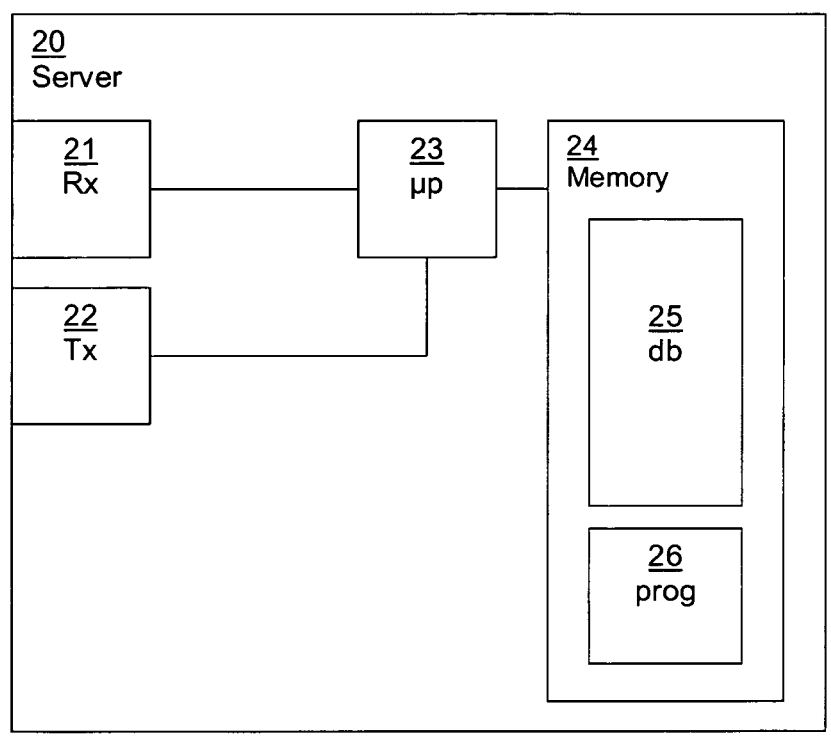
FIG. 4 illustrates schematically in a block diagram a remote server according to an embodiment of the invention.

FIG. 4 illustrates a remote server 20 according to an embodiment of the invention. The server is provided with a receiver 21 and a transmitter 22 for communicating with the device 1. A processor 23 is provided for handling messaging.

A memory 24 stores a database 25, which is populated with identities of applications and/or malware that may request location information, and also with further information relating to each application/malware. The further information may include instructions on actions for the device to take in the event that the location application is requesting further information, or in the event that the location application cannot be identified. In the event that the location application cannot be identified, the processor 23 is arranged to send request messages to the device 1, requesting further information such as other files in the same location, associated installation packages, associated registry entries and so on. Once this information is collected it can be stored in the memory and subsequently used to assist in identifying the location application or formulating rules to apply to location information sent to the location application. The database 25 may be located as shown at a memory 24 at the server 20, but it will be appreciated that it may be stored remotely from the server 20.

A program 26 may also be stored in the memory 24, with instructions executable by the processor 23 for carrying out the invention.

It will be appreciated by the person of skill in the art that various modifications may be made to the above-described embodiments without departing from the scope of the invention.

The invention claimed is:

1. A method of controlling location information at a computer device, the method comprising performing the following steps in order:
   at the computer device, intercepting and obtaining location information from an application programming interface destined for a location application at the computer device; after intercepting and obtaining the location information, identifying the location application; determining a rule to be applied to the location information; wherein the rule is determined based at least in part on the identified location application; applying the rule to the location information to generate amended location information; and sending the amended location information to the location application.

2. The method according to claim 1, wherein the rule is selected from any of:
   replacing the location information with less specific location information;
   replacing the location information with location information specified by a user;
   replacing the location information with previous location information previously approved by the user;
   replacing the location information with no location information; and
   making no changes to the location information.

3. The method according to claim 1, wherein the rule further comprises varying the amended location information with time prior to sending the location information to the location application.

4. The method according to claim 1, further comprising, in the event that the location application cannot be identified, applying a predetermined default rule to the location information to give amended location information, prior to sending the amended location information to the location application.

5. The method according to claim 1, further comprising alerting a user of the device that a location application has requested location information.

6. The method according to claim 1, further comprising:
   sending from the computer device to a remote node information relating to the location application; and
   receiving from the remote node further information relating to the identified location application.

7. The method according to claim 5, further comprising, as a result of receiving information relating to the identified location application, terminating the location application.

8. The method according to claim 1, wherein the location information is selected from any of Global Positioning System data, an identity of an Access Point (AP) to a Wireless Local Area Network, an identity of a network cell in which the computer device is located, and satellite positioning information.

9. An apparatus for controlling location information comprising: at least one processor; memory storing computer program code; wherein the computer program code is configured to, with the at least one processor, cause the apparatus to at least perform the following steps in order;
   intercept and obtain location information, wherein the location information is obtained by intercepting the location information from an application programming interface destined for a location application; store in a database a plurality of rules to apply to the location information, the database comprising at least one rule entry for each identified location application;
   after the location information has been intercepted and obtained, identify the location application and subsequently apply a rule to the location information on the basis of the identity of the location application, so as to generate amended location information prior to sending the amended location information to the location application.

10. The apparatus according to claim 9, wherein the database further comprises at least one rule to be applied to the intercepted location information in the event that an identified location application is not stored in the database.

11. The apparatus according to claim 9, further comprising a user input device allowing a user to enter data for one of populating the database and amending rules.

12. The apparatus according to claim 9, further comprising:
   a transmitter for sending to a remote node information for use in identifying the location application; and
   a receiver for receiving from the remote node further information relating to the location application.

13. The apparatus according to claim 9, wherein the rule is selected from any of:
   replacing the location information with less specific location information;
   replacing the location information with location information specified by a user;
   replacing the location information with previous location information previously approved by the user;
   replacing the location information with no location information; and
   making no changes to the location information.

14. A non-transitory computer readable memory medium storing a computer program comprising computer readable code which, when run on a computer device, causes the computer device to execute a method according to claim 1.

15. A non-transitory computer readable memory medium storing a computer program comprising computer readable code which, when run on a computer device, causes the computer device to behave as a device according to claim 9.

16. A computer program product comprising a non-transitory computer readable storage medium and a computer program according to claim 14, wherein the computer program is stored on the computer readable storage medium.

17. A computer program product comprising a non-transitory computer readable storage medium and a computer program according to claim 15, wherein the computer program is stored on the computer readable storage medium.

* * * * *